2,837,486
Patented June 3, 1958

2,837,486
SILVER-ALKALINE EARTH METAL CATALYST

Gustav Lawrence Osberg, Ottawa, Ontario, Canada, assignor to National Research Council, Ottawa, Ontario, Canada, a body corporate of Canada No Drawing. Application July 29, 1954
Serial No. 446,639

7 Claims. (Cl. 252—437)

The present invention has for its object the provision of a novel and improved granular silver-alkaline earth metal catalyst for use as a fluidized bed catalyst in the catalytic oxidation of ethylenic hydrocarbons.

Heretofore, silver-alkaline earth metal catalysts granular in form and adapted for use as a fluidized bed in the catalytic oxidation of ethylene and other ethlenic hydrocarbon compounds have had the disadvantage of packing or sticking together, and in that condition could no longer function as a fluidized bed. Various proposals have been made to overcome this tendency to pack, but in almost all instances, these proposals have required the addition of a relatively large amount of a foreign substance which substantially dilutes the catalyst and requires the provision of larger equipment for processing a given quantity of ethylene, or otherwise impairs the efficiency and economy of the process.

According to the present invention, a very small amount of an additive of an inorganic salt in the form of a powder selected from the group consisting of calcium oxide, calcium carbonate, calcium cyanamid, calcium phosphate, barium oxide, barium carbonate, strontium oxide and strontium carbonate and compounds which on decomposition yield the foregoing compounds is added to a granular catalyst formed from a silver-alkaline earth metal alloy which has been properly activated for the oxidation of ethylenic hydrocarbons. Such a catalyst is used in accordance with standard fluidized bed techniques in the catalytic oxidation of ethylene, and continues to operate over long periods of time without appreciable sticking together of the granular catalyst, and this tendency to remain "fluid" may be preserved by periodic additions to the granular catalyst mass of very small amounts of the chosen additive compound, sufficient to replace the powdered additive compound which is gradually blown out of the fluidized bed, or is entrained in the reacting gases and thereby removed from the active catalyst, the added powdered compound being gradually pulverized as the fluidized catalyst is used in the process.

Preferably the additive powdered material is from 0.2% to about 5.0%, and preferably about 1% of the mass of the total granular catalyst, and is preferably calcium oxide, barium oxide, barium carbonate, strontium carbonate, calcium cyanamid or most preferably calcium carbonate. Preferably, the silver base catalyst has a mesh size in the rage of −170 to +325.

The powder should be mixed well with the catalyst at a non sticky temperature so that the catalyst particles may be coated with the powder before an attempt is made to fluidize the catalyst at reaction temperatures. If the catalyst particles are not properly coated with the powder, sticking may occur at reaction temperature.

The catalyst may be any of the granular catalysts disclosed in the prior patent to Cambron and McKim, No. 2,562,858, patented July 31, 1951, chosen in proper sizes so as to be easily adapted to the fluidized bed technique, and these may be used with the powdered additive in the oxidation more fully described in the prior patent to Cambron and McKim, No. 2,562,857, patented July 31, 1951.

An example of a silver-alkaline earth metal catalyst used in accordance with the present invention is the silver-calcium alloy catalyst of Example I of the Cambron et al., Patent No. 2,562,858, which is prepared in the following manner. A silver calcium alloy containing 5.25% calcium is crushed and 44.1 grams of the alloy ranging in size from 0.8 mm. to about 1.7 mm. is oxidized in moist air at 400° C. for 48 hours and is treated with 20% acetic acid, washed and dried. The resulting catalyst contains 3.58% of calcium.

A number of specific working examples will be given hereinbelow to describe the invention even further.

Example I 1.0% by total weight of powdered calcium carbonate is mixed with the catalyst of Example I of the Cambron and McKim Patent No. 2,562,858 of 100 mesh in size, and is ground or milled therewith in a mill of the ball mill type for 3–10 minutes.

Example II 3.0% by total weight of powdered calcium oxide is mixed with the catalyst of Example I of the Cambron and McKim Patent, No. 2,562,858 of 250 mesh in size and is ground or milled therewith in a mill of the ball mill type for 3–10 minutes.

Example III 0.5% by total weight of powdered barium oxide is mixed with the catalyst of Example I of Cambron and McKim Patent No. 2,562,858 of 125 mesh in size, and is ground or milled therewith in a mill of the ball mill type for 3–10 minutes.

Example IV 4.5% by total weight of powdered barium carbonate is mixed with the catalyst of Cambron and McKim Patent No. 2,562,858 of 300 mesh in size, and is ground or milled therewith in a mill of the ball mill type for 3–10 minutes.

Example V 1.5% by total weight of powdered calcium cyanamid is mixed with the catalyst of Cambron and McKim Patent No. 2,562,858 of 140 mesh in size, and is ground or milled therewith in a mill of the ball mill type for 3–10 minutes.

Example VI 1.0% by weight of powdered strontium carbonate is mixed with the catalyst of Cambron and McKim Patent No. 2,562,858 of 225 mesh in size, and is ground or milled therewith in a mill of the ball mill type for 3–10 minutes.

Example VII

3% by weight of powdered calcium phosphate is mixed with the catalyst of Cambron and McKim No. 2,562,858 of 90 mesh in size, and is ground or milled therewith in a mill of the ball mill type for 3–10 minutes.

The invention in its broader aspects is not limited to the specific composition and process described, but departures may be made therefrom within the scope of the accompanying claims without departing from the principles of the invention and without sacrificing its chief advantages.

I claim:

1. A fluidizable bed catalyst for the oxidation of ethylenic hydrocarbons which comprises a granular silver-alkaline earth metal alloy from which 5% to all but a trace of the alkaline earth metal has been removed, the surface of the granules being coated with from 0.2% to about 5.0% of a powdered inorganic salt selected from the group consisting of calcium oxide, calcium carbonate, calcium cyanamid, calcium phosphate, barium oxide, barium carbonate, strontium oxide and strontium carbonate to render them non-agglomerating when fluidized as a catalyst in the oxidation of ethylenic hydrocarbons.

2. A fluidizable bed catalyst according to claim 1 wherein the inorganic salt is calcium carbonate.

3. A fluidizable catalyst as defined in claim 1 wherein the inorganic salt is calcium oxide.

4. A fluidizable catalyst as defined in claim 1 wherein the inorganic salt is barium oxide.

5. A fluidizable catalyst as defined in claim 1 wherein the inorganic salt is calcium cyanamid.

6. A fluid catalyst as defined in claim 1 wherein the inorganic salt is strontium carbonate.

7. A fluidizable catalyst according to claim 2 wherein the calcium carbonate is present in about 1% by weight of the total composition.

References Cited in the file of this patent

UNITED STATES PATENTS

| | | |
|---|---|---|
| 2,238,474 | McNamee et al. | Apr. 15, 1941 |
| 2,562,858 | Cambron et al. | July 31, 1951 |